May 25, 1965   H. HAUSER   3,185,435
VALVE CONSTRUCTION
Filed Feb. 15, 1962   5 Sheets-Sheet 2

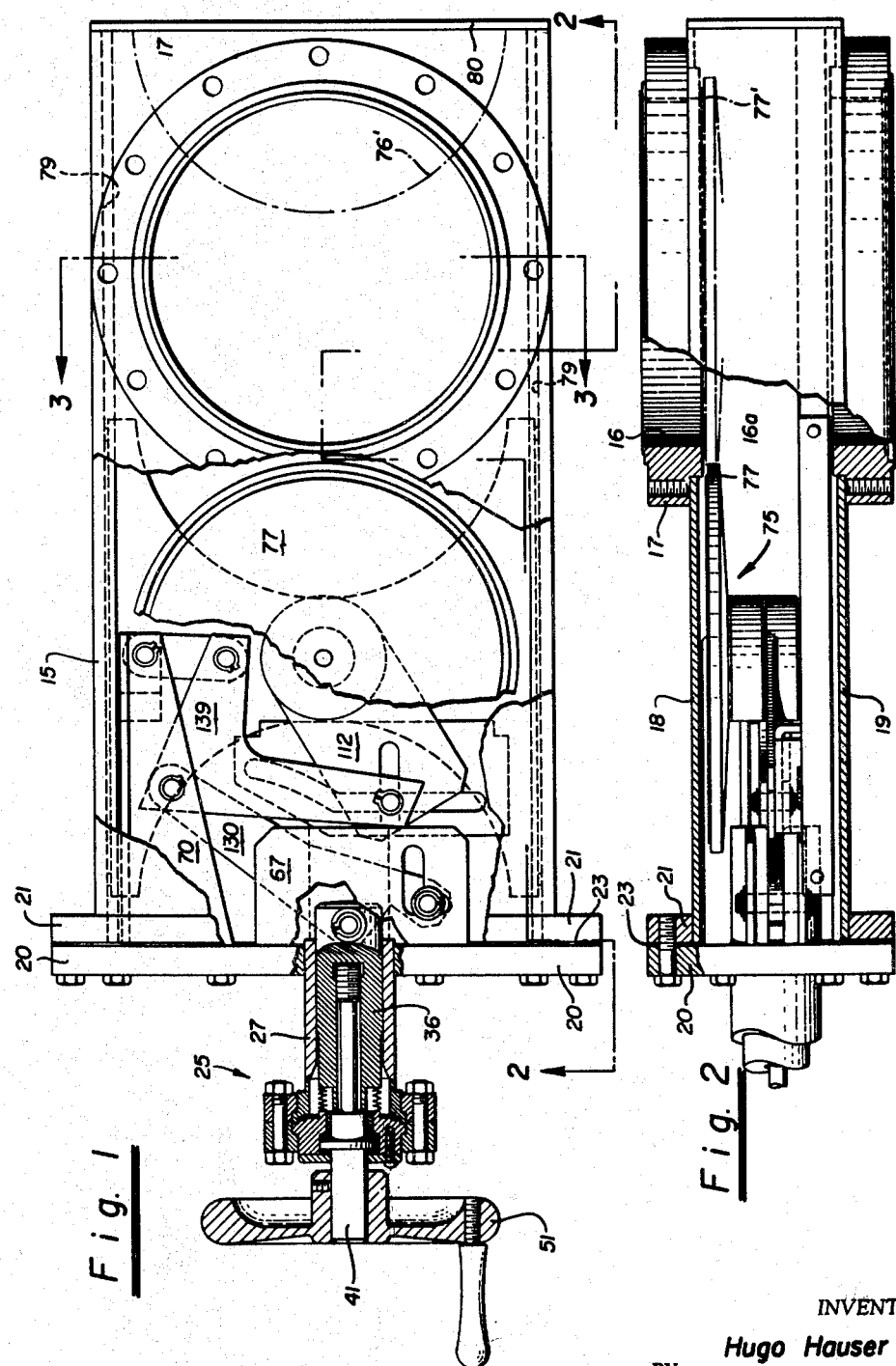

INVENTOR.
Hugo Hauser
BY
Attorneys

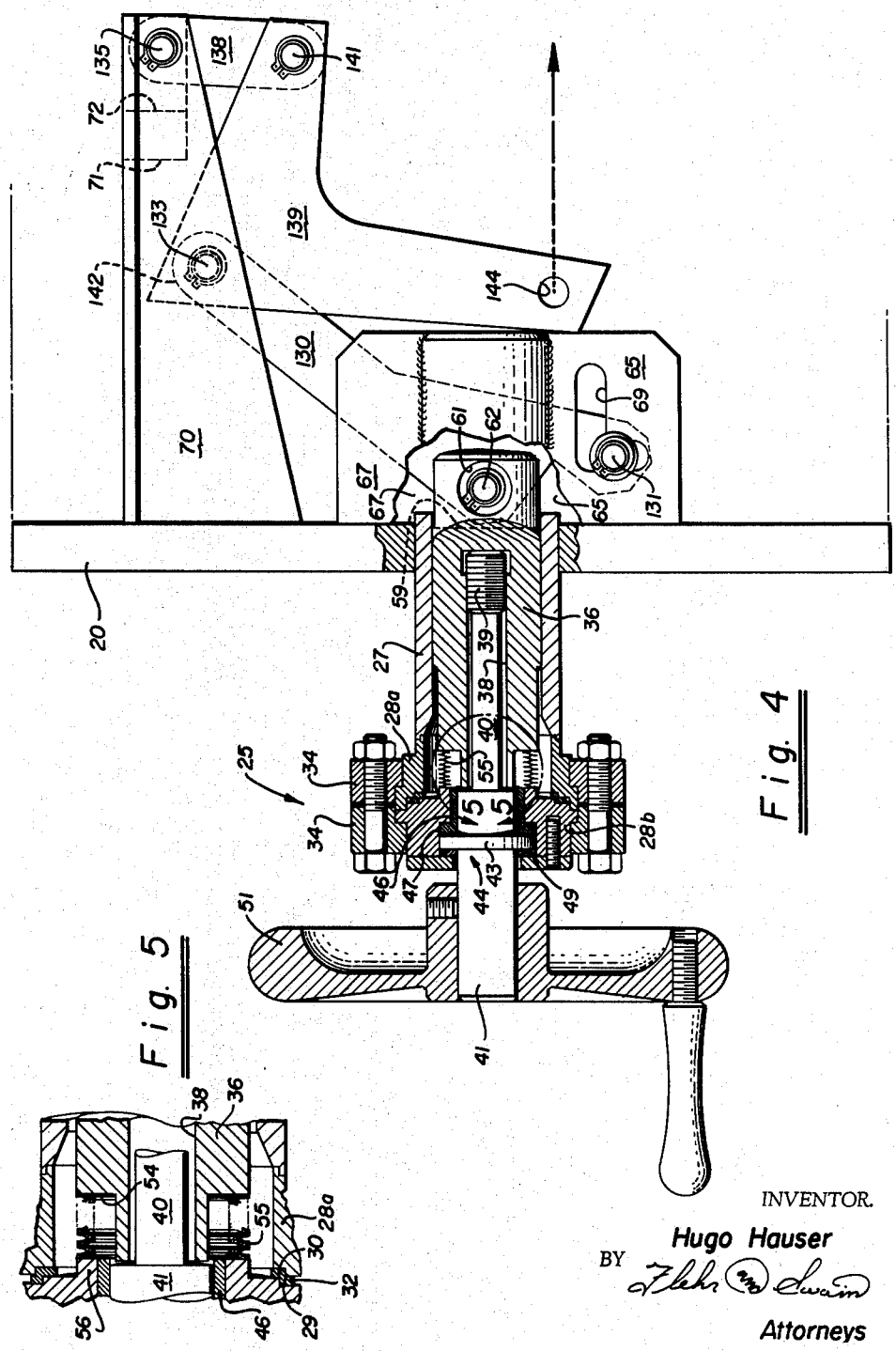

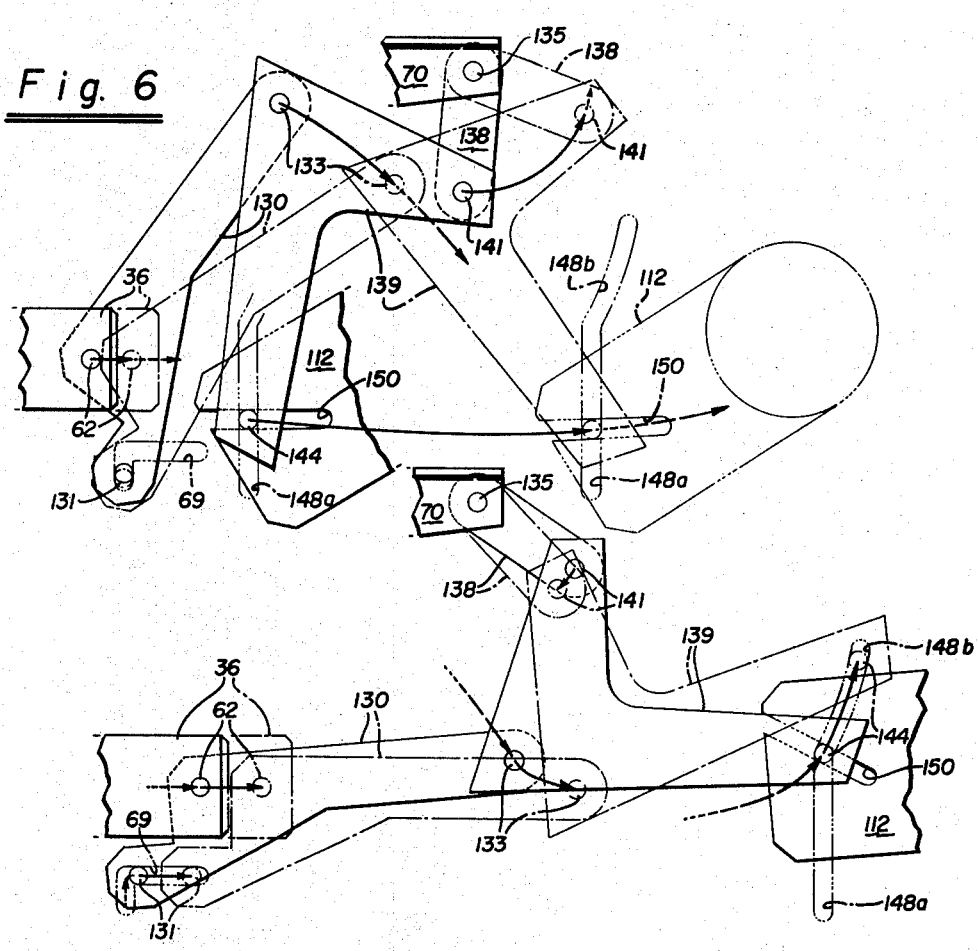

INVENTOR.
Hugo Hauser

United States Patent Office 3,185,435
Patented May 25, 1965

3,185,435
VALVE CONSTRUCTION
Hugo Hauser, Palo Alto, Calif., assignor to Ultek Corp., Palo Alto, Calif., a corporation of California
Filed Feb. 15, 1962, Ser. No. 173,495
4 Claims. (Cl. 251—153)

This invention relates to valves of the gate type suitable for controlling the flow of various fluids, including gases and liquids, and particularly useful in establishing a gas tight seal in high and ultrahigh vacuum systems.

In high and ultrahigh vacuum systems, in the usual instance, valves which provide maximum unobstructed gas conductance from one side to the other, are preferred. Maximum gas conductance for a high vacuum valve can generally be achieved by employing a flow passage of maximum diameter free of obstruction to molecular travel through the valve, together with provision of a flow path of minimum extent from one side of the valve to the other. This object therefore favors valve structures of the "gate" type as distinguished from other types, such as angle valves.

In the usual gate valve structure the closure member or gate can be moved fully out of the way of the flow passage being controlled, leaving a very short unobstructed passage across the valve. This short passage therefore contributes to maximum gas conductance when such a valve is used to couple two regions of a vacuum system.

Most gate valves, however, are arranged for sliding contact between the working surface of the seat and the working surface of the gate. While quite satisfactory for most purposes, they tend to leak when used to seal extreme vacuums. In accordance with the present invention a gate valve structure is provided that eliminates and positively insures against sliding movement between the valve working surfaces during closing or opening operations.

Thus, it is generally an object of the present invention to provide an improved gate valve suitable for services such as outlined above, and which will insure a tight shut off without sliding movement as in other gate valves.

Another object of the invention is to provide a gate valve having novel means connecting the operating plunger with a gate assembly, said means serving to provide a predetermined operating cycle for closing and opening operations.

Further objects and features of the invention will appear from the following description in which a preferred embodiment has been set forth in detail in conjunction with the accompanying drawings.

Referring to the drawings:

FIGURE 1 is a front elevation view partially in section illustrating my valve with portions of the front face removed.

FIGURE 2 is a side elevation view in section along the line 2—2 of FIGURE 1.

FIGURE 4 is an enlarged cross-sectional detail illustrating the plunger assembly of the valve shown in FIGURE 1.

FIGURE 5 is a detail of a portion of FIGURE 4 further enlarged and illustrating the gas tight seal in the plunger assembly.

FIGURES 6 and 7 illustrate progressive movements of the drive linkage of FIGURE 1.

Figure 10:
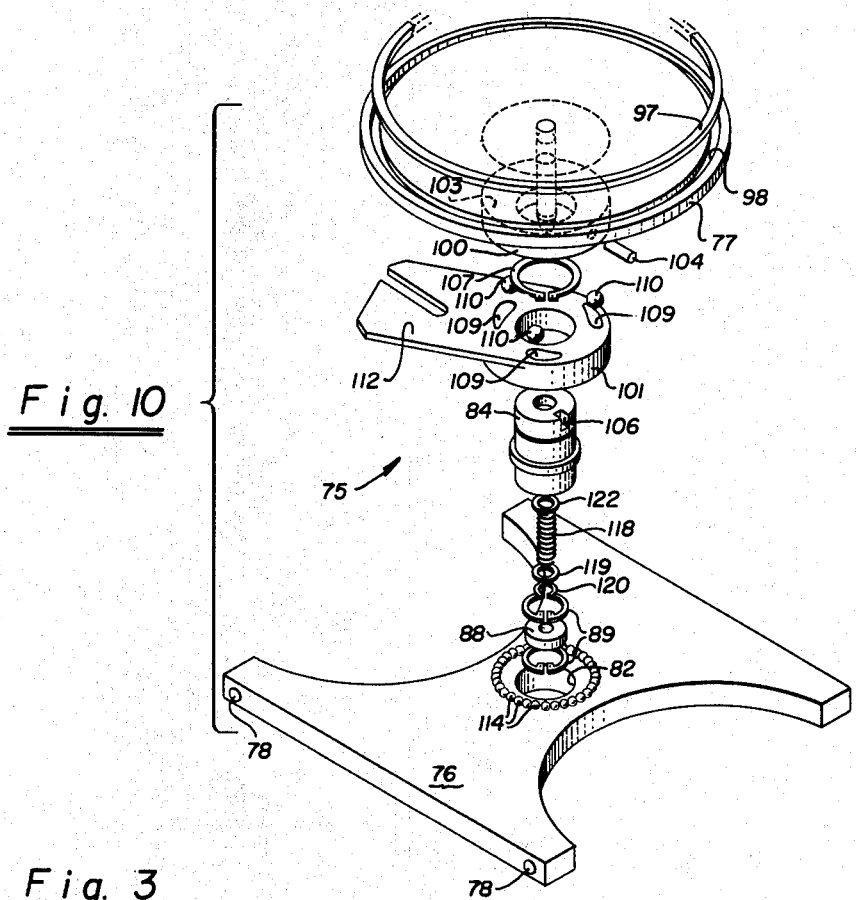
FIGURE 10 is an exploded isometric view of the closure assembly.

The valve as illustrated in FIGURE 1 of the drawings consists of a body 15 provided with flow passages 16. Flanges 17 or other suitable means can be provided for coupling the body to associated piping or, for example, two portions of a vacuum system. Body 15 preferably is fabricated by welding flat plates of steel together to form a box-like structure. Thus plates 18 form the ends and plates 19 the sides of the body. Flanges 17 have sufficient strength to prevent warping and to permit a considerable force to be applied thereto when bolting the valve in place. A body closure plate 20 is bolted to a rectangular flange 21 fixed around the left end of the body as viewed in FIGURES 1 and 2. A suitable sealing ring or gasket 23 is interposed between the opposing faces of body closure plate 20 and rectangular flange 21.

A sleeve 27 is mounted on plate 20 as by welding. Its outer end is sealed with respect to valve operating means by a suitable sealing assembly. The assembly shown is of an all metal type and includes a member 28a forming one-half of the seal. Member 28a has an annular shearing shoulder 29 which coacts with a corresponding shearing shoulder 30 formed on a corresponding half 28b of the seal. Interposed between shearing shoulders 29 and 30 is a copper gasket 32. In order to apply compressive force upon gasket 32 to effect a high vacuum seal, the assembly includes a pair of flanges 34 bolted together and sealed upon members 28a and 28b. The foregoing high vacuum seal can also be constructed in accordance with copending patent application Serial No. 145,027, filed October 13, 1961, now abandoned and assigned to the assignee herein.

The valve operating means includes a plunger 36 mounted for longitudinal movement within sleeve 27 and having a coaxial threaded bore 38 for engaging the threaded end 39 of a spindle or stem 40. To provide suitable thrust bearing means, the spindle 40 is provided with a portion 41 of enlarged diameter which in turn carries a flange 43. Flange 43 is retained between the journal bushing 46 and the journal annulus 47.

A hand wheel or other suitable means is fixed to the outer end of spindle portion 41. Suitable motive means which may be electrical, pneumatic, or hydraulic, may be employed for remote operation.

In order to form a gas tight seal between body 15 and the plunger, the latter is shown provided with a shoulder 54 to which is welded one end of a metallic bellows 55 of suitable material such as stainless steel. The other end of bellows 55 is welded to a short annular extension 56 formed on member 28b. Thus the space between plunger 36 and sleeve 27 is sealed from the atmosphere.

The plunger 36 has its inner end connected to means whereby when the plunger is moved between inner and outer limiting positions, the valve is opened and closed in a particular manner. Thus the inner end of plunger 36 is formed with a slot 59 and a pin 61. Secured to the interior face of body closure plate 20 there is a pair of brace members 65 and 66 (FIGURE 2). A similar pair of brace members 67 are likewise disposed on the opposite side of sleeve 27 and secured along plate 20 and sleeve 27. Brace members 65 and 66 are provided with L-shaped channels 69 disposed in registry and oriented with the shorter leg of the L transverse to the direction of movement of plunger 36 and the longer leg parallel thereto to form a pivot way. The interior face of body closure plate 20 further supports an angle brace 70 welded thereto. The free end of brace 70 is formed with a rectilinear support block 71 formed with an open slot 72 cut parallel to the plane of brace 70.

Figure 3:
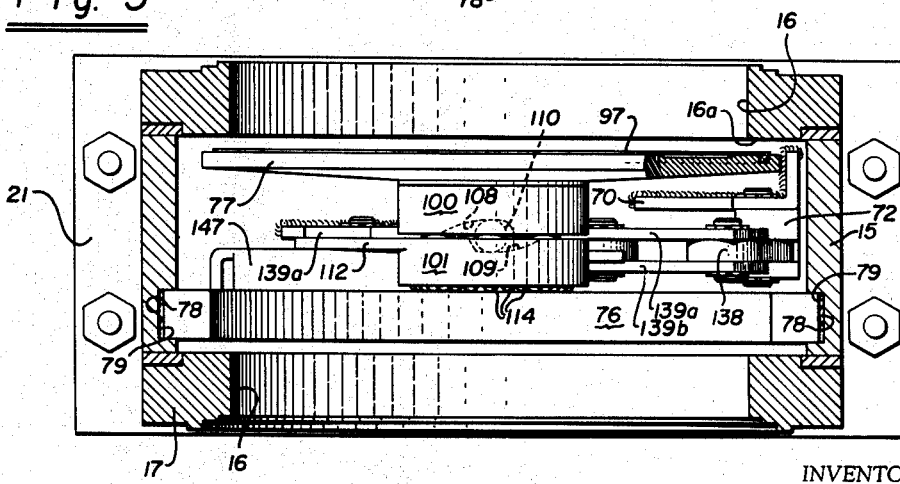
FIGURE 3 is an end view in section taken along the line 3—3 of FIGURE 1.

Within the body and movable laterally of the passages 16, there is a gate assembly 75. Assembly 75 includes a carriage plate 76 and a closure plate 77. Near the ends of the plate 76 there are buttons 78 of suitable material, such as aluminum-bronze alloy, to provide wear surfaces for engaging the guiding surfaces of ways 79 (FIGURE 3) that are formed along the sidewalls of body 15. As thus arranged plate 76 slides lengthwise of body 15, and in its one limiting position it is in abutment with the end panel 80. This position of plate 76 is shown in FIGURE 1 by the phantom lines 76'.

The closure plate 77 is connected to carriage plate 76 by means which permits projection and retraction of plate 77 relative to the stationary seating surface 16a. Thus, plate 76 is shown provided with a hole 82 formed centrally thereof to receive a stud 84. Stud 84 is rigidly fixed in hole 82 as by welding, and has an inner bore 85 and a smaller opening 86 in its free end. Inside the fixed end of stud 84 there is a socket annulus 88 axially locked in place as by the snap-in rings 89. The conically shaped socket 90 in annulus 88 accommodates the conical shaped end of a centering pin 92.

Pin 92 is fixed to the center of the closure plate 77. A spherical surface 94 is formed on plate 77 about the bore of pin 92. Thus, socket 90 serves to lock plate 77 in fixed relation with respect to carriage plate 76. The opposite face of closure plate 77 includes a seal ring 97 of suitable material such as synthetic rubber, plastic, etc. Where the valve structure is to be utilized in high and ultrahigh vacuum systems, it is preferable to use a seal ring material not particularly subject to out-gassing, such as Viton A. Seal ring 97 is fixed upon the sealing surface of closure plate 77 by pressing or bonding the same into a machined groove.

Closure plate 77 is arranged to be projected from plate 76 by a cam assembly which includes a pair of annular members 100 and 101 loosely disposed on stud 84. Member 100 includes a spherical face 103 treated, as by electrolizing, in order to provide a gall resistant thrust surface of around 70 Rockwell. Member 100 is free to slide lengthwise along stud 84 but is kept from turning by a key arrangement which includes a pin 104 inserted radially through member 100 and into a notch 106 cut in the distal edge region of stud 84.

The surface of member 100 remote from thrust surface 103 is formed with three depressions 108. In each depression 108, the bottom surface is inclined so as to provide a diminishing depth therein.

The member 101 is held axially on stud 84 as by means of a snap ring 107. Three depressions 109 similar to depressions 108 are formed in the opposing face of member 101. The deepest portions of each set of depressions 108 and 109 overlap in registry with one another to hold a spherical stainless steel ball 110 therebetween. A lever 112 is fixed to member 101 whereby the latter can be turned about the stud 84. Ball bearings 114 are interposed between plate 76 and member 101 and located to ride in an annular race formed in each, to minimize turning friction.

Figure 8:
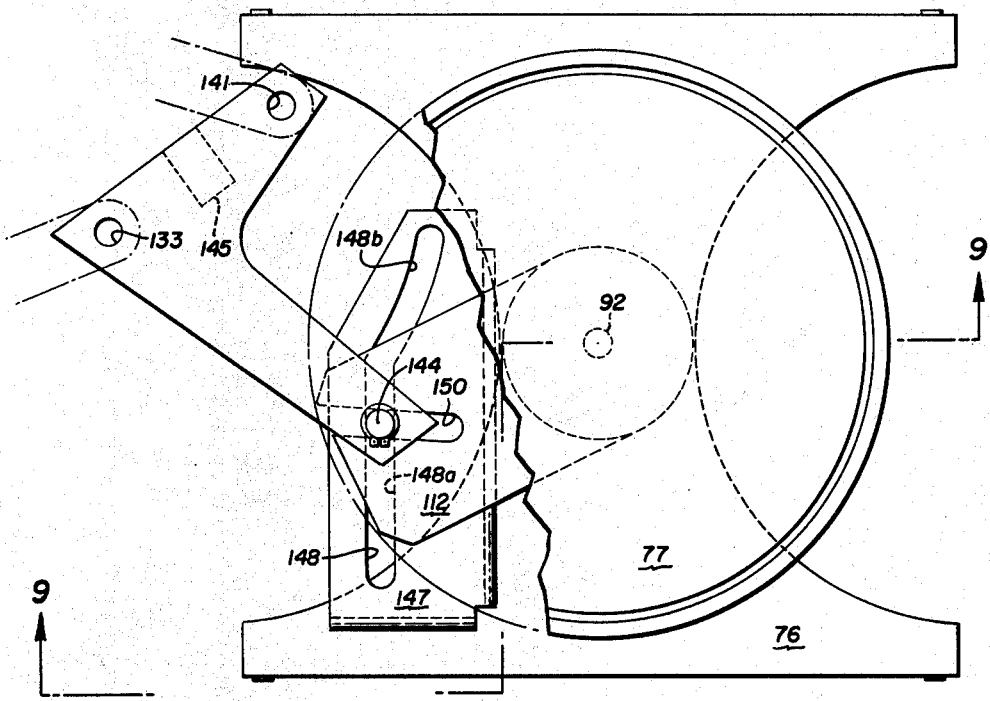
FIGURE 8 is a plan view partially broken away of the closure assembly.
Figure 9:
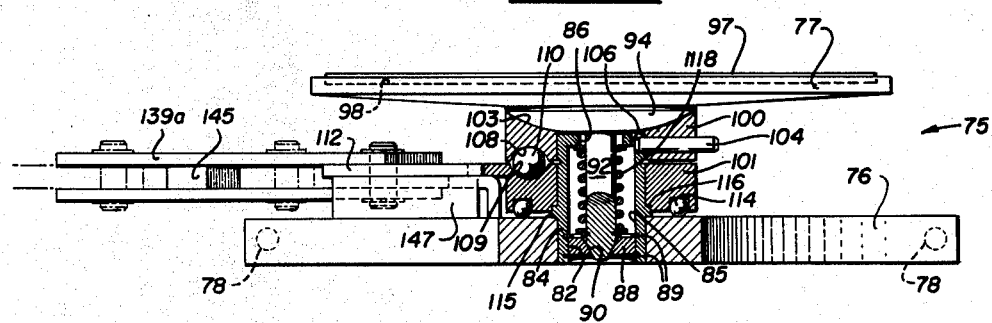
FIGURE 9 is a side elevation of FIGURE 8 in section taken along the line 9—9 of FIGURE 8.

Clockwise rotation (FIGURE 8) of lever 112 will result in a camming action between ball 110 and the surfaces of depressions 108 and 109 thus moving closure plate 77 away from plate 76. It should be observed that as pin 92 is removed from socket 90, the spherical surfaces 94 and 103 permit is limited degree of self-alignment of plate 77 with the working surface 16a.

In order to retract plate 77 toward plate 76 upon release of lever 112, there is provided a compression spring 118 disposed about pin 92, which presses against a washer 119 held in place by a retaining ring 120, snapped into a groove upon pin 92. The other end of spring 118 engages a washer 122 located within stud 84 and presses in upon the margin around opening 86. Thus, as plate 77 is cammed away from plate 76, spring 118 is compressed and will retract plate 77 upon release of lever 112.

The inward thrust of plunger 36 is transmitted to carriage plate 76 by a linkage which first moves the carriage into abutment with end panel 80. Then, while holding the abutting relation, the linkage acts to project closure plate 77 straight upon working surface 16a free of relative lateral movement between plate 77 and surface 16a while moving the former in a direction perpendicular to the latter. During retraction of plate 77 from working surface 16a, the abutting relation is maintained to insure against sliding contact between the working surfaces. Thus, positive registration of plate 77 with respect to working surface 16a is assured before contact is made, and relative lateral movement is precluded by pin 104 in notch 106.

The linkage includes a rocker arm 130 pivotally coupled by pin 62 to the inner end of plunger 36. Arm 130 pivots about a floating pivot pin 131 disposed to ride in the channel 69. Channel 69 thus forms a pivot way having a short leg transverse and a longer leg parallel to the direction of travel of the plunger.

A second rocker arm 139 is formed from a pair of flat generally triangular members 139a and 139b, held spaced apart by a rectangular-shaped block 145 fixed therebetween. Rocker 139 is connected by pivot pin 141 to a link 138 which in turn is pivoted by pin 135 to the fixed support 70. Rocker 139 is also connected by pivot pin 133 to that end of arm 130 that is remote from floating pivot 131. Rocker 139 also carries a pin 144 for operating the closure assembly 75 as well as for moving the carriage to register plate 76 with working surface 16a.

Pin 144 drives the carriage through a cam member 147 fixed to one side of the carriage plate 76. Member 147 includes cam track 148 disposed generally across the direction of travel of plunger 36. Track 148 is formed with a first portion 148a substantially perpendicular to the direction of travel of plunger 36 and a second portion 148b of arcuate curvature leading slightly to the right as viewed in FIGURE 8. Cam operating lever arm 112 is interposed between cam member 147 and member 139a of rocker 139. The pin 144 passes through rocker 139, slot 143, and through a slot 150 formed at an angle with respect to the direction of extent of lever arm 112. Pin 144 is thus able to push upon the sides of the track portion 148a to move the carriage in opposite directions along body 15, and can also rotate lever arm 112 to project the closure plate 77.

The valve as described above operates as follows:

In the closing operation the linkage starts from a full open position and follows a predetermined cycle of movement including (a) an initial large carriage displacement, (b) bottoming of the carriage to register plate 77 with working surface 16a, and (c) projection of plate 77 perpendicularly upon working surface 16a by continued thrust of plunger 36.

Progressive positions of the linkage are shown in FIGURES 6 and 7. The starting position is shown in full lines in FIGURE 6. As plunger 36 drives pivot pin 62 into body 15, arm 130 rocks about pin 131. Pin 133 of arm 130 moves an amount multiplied by the difference in moments thereby carrying pin 144 through a large displacement in a direction substantially parallel to the direction of plunger movement. This position appears in phantom lines in FIGURE 6. Displacement of pin 144 moves carriage 76 forwardly with it. During this phase of movement of carriage 76, cam track portion 148a permits pin 144 to make lateral adjusting movements therein.

By continuing the plunger thrust, arm 130 will eventually rotate around to a position nearly parallel to the direction of plunger movement whereby the pin 131 will move around the corner in channel 69 and enter the longer leg thereof, i.e., as shown in full lines in FIGURE 7. At this stage, pins 133 and 144 approach a line of centers with pin 62, and carriage 76 abuts panel 80 to limit further longitudinal movement thereof. The resistance of panel 80 together with further thrust of plunger 36 causes pin 144 to sweep transversely along cam track portion 148b. This sweeping movement serves to rotate lever arm 112 to project plate 77 perpendicularly toward working surface 16a, thereby closing and sealing the valve.

When it is desired to open the valve, reversing the applied thrust on plunger 36 first moves pin 144 transversely along portion 148b thereby rotating lever 112. Plate 77 is therefore retracted perpendicularly from working surface 16a. Subsequently, carriage 76 is returned through the positions shown to the fully open position of FIGURE 6.

From the foregoing it will be evident that a valve of the above construction has a number of desirable features and advantages. For example, in both closing and opening the valve the sealing ring is not dragged across the working surface of the stationary seat. Furthermore, a gas tight seal is formed between a rotating stem and the valve body to permit the gate valve to be used in high vacuum systems. It should also be noted that all the moving parts of the valve can be removed as a unit for servicing and that a short movement of the plunger provides a large throw to the gate.

I claim:

1. In a valve of the gate type, a valve body having aligned flow passages, a stationary valve seat carried by the body and forming a planar valve working surface surrounding one of the passages, a gate assembly unit disposed within the valve body, said unit including a carriage movable transversely of the flow passages in opposite directions between limiting positions corresponding to fully open and closed positions of the valve, a valve closure plate, interconnecting means forming a connection between the closure plate and the carriage, the closure plate having one planar face thereof adapted to contact and form a fluid tight seal with respect to the valve working surface of the seat, a movable operating plunger extending into the body, and means forming a mechanical connection between said operating plunger and said gate assembly unit, said last named means serving to move the assembly unit between open and closed valve positions responsive to movements of the operating plunger, said interconnecting means being responsive to said last named means and arranged to move said plate between a projected and a retracted position with respect to the plane of said carriage while the carriage is in one of said limiting positions, means operable in said retracted position to lock said plate in a predetermined planar orientation with respect to said carriage, and means operable to free said plate from said orientation in said projected position to permit coplanar alignment of said plate with said seat, said interconnecting means including a thrust surface formed on the back of said closure plate, a guide pin fixed centrally of and extending away from said thrust surface, a stud supported by and disposed to extend away from said carriage, said stud having a socket formed and disposed to receive and lock said pin with respect to said carriage, spring means urging said pin into said socket to hold said closure plate in a predetermined retracted orientation with respect to said carriage, said interconnecting means acting upon said thrust surface to overcome the spring means to project said plate with respect to said stud and form a fluid tight seal with said seat.

2. A valve as in claim 1 in which said stud is disposed to provide a distal and a proximal end thereof, said distal end including a coaxial opening and said proximal end including said socket disposed in registry with said opening, a first cam member keyed to said stud and free to move lengthwise thereof, said first cam member having a thrust surface on one side conforming to and engaging the thrust surface of said closure plate, a second cam member mounted for rotation on said stud and disposed between said first cam member and said carriage, and means operably coupled to respond to said plunger during a terminal portion of the travel thereof to force said cam members apart to project said closure plate onto said seat.

3. A valve as in claim 2 in which the last named means is interposed between said cam members and comprises the opposed faces of said cam members, each of said opposed face being formed to include a plurality of depressions, the depressions of one face being registered with the depressions of the other, the bottom surface of each depression being inclined to provide a diminishing depth therein, and a spherical ball interposed to ride between each pair of opposed depressions whereby rotation of said second cam member with respect to said first cam member moves said members apart.

4. In a valve of the gate type, a valve body having aligned flow passages, a stationary valve seat carried by the body and forming a planar valve working surface surrounding one of the passages, a gate assembly unit disposed within the valve body, said unit including a carriage movable transversely of the flow passages in opposite directions between limiting positions corresponding to fully open and closed positions of the valve, a valve closure plate, interconnecting means forming a connection between said closure plate and said carriage, the closure plate having one planar face thereof adapted to contact and form a fluid tight seal with respect to the valve working surface of the seat, a reciprocating operating plunger extending into the body, said interconnecting means including a pair of camming elements, a lever arm fixed to one of said camming elements and including a way therein for rotating one of said camming elements with respect to the other, means forming a mechanical connection between said operating plunger and said gate assembly unit, said last named means including linkage means comprising a first rocker arm pivotally coupled to said plunger, a stationary pivot way fixed with respect to said body and disposed to have a first leg transverse to and a second leg parallel to the direction of movement of said plunger, a pivot pin loosely disposed in said pivot way to move from one of said legs to the other and coupling an end of said first rocker arm to said way for travelling pivoting movements along said way, a second rocker arm pivotally coupled to the other end of said first rocker arm, a link pivoted at one end about a stationary pin supported by said body, the other end of said link being pivotally coupled to said second rocker arm, the direction of movement of said plunger lying in a plane between said stationary pin and said stationary pivot way, a cam track fixed to said carriage, said cam track being disposed transversely of the direction of movement of the plunger, and coupling means pivotally coupling said second rocker arm to both said cam track and the way of said lever arm, the cam track and the way of the lever arm being formed for movement of said coupling means in a direction transverse to the direction of movement of said plunger during a terminal portion of the movement of the latter into said body whereby said plunger operates said linkage means first to move the carriage to a limiting position registering the closure plate with said working surface and then to project said closure plate substantially parallel to the axis of said flow passages into contact with said seat.

References Cited by the Examiner

UNITED STATES PATENTS

| 1,707,125 | 3/29 | Löffler | 251—193 |
| 2,682,386 | 6/54 | Lindsay | 251—335 XR |
| 2,850,260 | 9/58 | Perazone et al. | 251—203 XR |
| 2,863,629 | 12/58 | Knox | 251—171 |
| 2,907,342 | 10/59 | Berg et al. | 251—176 XR |
| 3,003,742 | 10/61 | Kearns | 251—204 XR |
| 3,112,095 | 11/63 | Batzer | 251—204 XR |

FOREIGN PATENTS 1,131,705  10/56  France.

LAVERNE D. GEIGER, Primary Examiner.

ISADOR WEIL, Examiner.